US012578880B2

(12) United States Patent
Giovannini

(10) Patent No.: US 12,578,880 B2
(45) Date of Patent: Mar. 17, 2026

(54) MEMORY MANAGEMENT METHOD TO SAVE ENERGY

(71) Applicant: STMicroelectronics International N.V., Geneva (CH)

(72) Inventor: Michael Giovannini, Grenoble (FR)

(73) Assignee: STMicroelectronics International N.V., Geneva (CH)

( * ) Notice: Subject to any disclaimer, the term of this patent is extended or adjusted under 35 U.S.C. 154(b) by 18 days.

(21) Appl. No.: 18/420,263

(22) Filed: Jan. 23, 2024

(65) Prior Publication Data

US 2024/0256154 A1     Aug. 1, 2024

(30) Foreign Application Priority Data

Jan. 27, 2023     (FR) ...................................... 2300753

(51) Int. Cl.
G06F 3/06          (2006.01)
(52) U.S. Cl.
CPC .......... G06F 3/0625 (2013.01); G06F 3/0634 (2013.01); G06F 3/0673 (2013.01)
(58) Field of Classification Search
CPC .... G06F 3/0625; G06F 3/0634; G06F 3/0673; G06F 1/3275; G06F 1/3225; G06F 3/0604; G06F 3/0658; G06F 13/1668; G11C 5/148
See application file for complete search history.

(56) References Cited

U.S. PATENT DOCUMENTS

| 10,754,415 | B2 | 8/2020 | Ozawa | |
| 11,940,857 | B2 * | 3/2024 | Dressler | G06F 13/4273 |
| 2012/0185687 | A1 | 7/2012 | Matsumura et al. | |
| 2019/0304514 | A1 * | 10/2019 | Matsunaga | H04N 1/00896 |
| 2019/0354308 | A1 * | 11/2019 | Li | G06F 3/0653 |
| 2021/0173468 | A1 * | 6/2021 | Giovannini | G06F 1/3225 |
| 2022/0171887 | A1 * | 6/2022 | Chritz | H04L 9/3242 |
| 2022/0180915 | A1 * | 6/2022 | Kim | G11C 16/30 |

OTHER PUBLICATIONS

INPI Search Report and Written Opinion for priority application, FR Appl. No. 2300753, report dated Sep. 14, 2023, 8 pgs.

* cited by examiner

*Primary Examiner* — Zhuo H Li
(74) *Attorney, Agent, or Firm* — Crowe & Dunlevy LLC

(57)          ABSTRACT

A system includes a memory formed by memory units accessible in write mode and in read mode. Each memory unit includes an array of memory cells and a peripheral circuit of access to the memory cells. Each memory unit is configurable in a first operating mode and a second operating mode. The array of memory cells are set in the first operating mode and the second operating modes to retain data until a subsequent powering off of the memory unit. The peripheral circuit is powered in the first operating mode and is not powered in the second operating mode. A controller configures any memory unit of the memory having undergone no write or read access for a determined time period to be in the second operating mode.

11 Claims, 2 Drawing Sheets

MEMORY MANAGEMENT METHOD TO SAVE ENERGY

PRIORITY CLAIM

This application claims the priority benefit of French Application for Patent No. 2300753, filed on Jan. 27, 2023, the content of which is hereby incorporated by reference in its entirety to the maximum extent allowable by law.

TECHNICAL FIELD

The present disclosure relates to the field of memory management for power saving purposes.

BACKGROUND

A volatile memory is a computer memory which requires a continuous electric power supply to keep the information which is stored therein. When the electric power supply is interrupted, the information contained in the volatile memory is, quasi immediately, lost. It may be a random-access memory of a microprocessor or of a microcontroller where a processor is configured to write data into or read data from the memory.

In certain applications, the entire volatile memory may not be permanently used during the operation of the micro-processor or of the microcontroller. As an example, the processor may access, during an operating phase, a portion of the volatile memory only and, during another operating phase, another portion of the volatile memory only. However, it is necessary for the volatile memory to remain permanently powered so that no data stored in the volatile memory is lost. Part of the electric power consumed by the volatile memory then corresponds to the static power consumption of the portions of the volatile memory which are not being used.

There is a need in the art to control a memory to decrease its power consumption, and this, without losing possible data that it would store.

There is a need in the art to overcome all or part of the disadvantages of known volatile memories.

SUMMARY

An embodiment provides a system comprising a memory, the memory comprising a plurality of memory units accessible in write mode and in read mode, each memory unit comprising an array of memory cells and a peripheral circuit of access to said memory cells, each memory unit being configurable in a first operating mode and in a second operating mode, the array of memory cells being configured, in the first and the second operating modes, to retain data until a subsequent powering off of the memory unit, the peripheral circuit being powered in the first operating mode and not being powered in the second operating mode, the system further comprising a controller configured to configure in the second operating mode any memory unit of the memory having undergone no write or read access for a determined time period.

According to an embodiment, the controller is configured to configure in the first operating mode any memory unit of the memory for which a write or read access is performed.

According to an embodiment, for each memory unit, the peripheral circuit of the memory unit is powered by a source of a high reference potential via a controllable switch, the controller being configured to control the turning on of the controllable switch when the memory unit is in the first operating mode and to control the turning off of the con-trollable switch when the memory unit is in the second operating mode.

According to an embodiment, the controller comprises, for each memory unit, a register and the controller comprises a processing unit configured to store a first value in the register when the corresponding memory unit is in the first operating mode and store a second value in the register when the corresponding memory unit is in the second operating mode.

According to an embodiment, the controller comprises one counter for each memory unit, each counter being incremented at each pulse of a clock signal, the processing unit being configured to reset the counter when a read or write access to the corresponding memory unit is performed.

According to an embodiment, for each memory unit, the processing unit is configured to store the second value in the corresponding register when the corresponding counter exceeds a threshold.

According to an embodiment, the memory is a volatile memory, for example a RAM memory.

According to an embodiment, the system is a system on chip.

An embodiment also provides a method of controlling a memory, comprising a plurality of memory units accessible in write mode and in read mode, each memory unit com-prising an array of memory cells and a peripheral circuit of access to said memory cells, the array of memory cells being configured, in the first and the second operating modes, to retain data until a subsequent powering off of the memory unit, the peripheral circuit being powered in the first oper-ating mode and not being powered in the second operating mode, the method comprising the configuration in the sec-ond operating mode of any memory unit of the memory having undergone no write or read access beyond a deter-mined time period.

According to an embodiment, the method comprises the configuration in the first operating mode of any memory unit of the memory for which a write or read access to the corresponding memory unit is performed.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which.

DETAILED DESCRIPTION

Like features have been designated by like references in the various figures. In particular, the structural and/or func-tional features that are common among the various embodi-ments may have the same references and may dispose identical structural, dimensional and material properties. For the sake of clarity, only the steps and elements that are useful for the understanding of the described embodiments have been illustrated and described in detail.

Unless specified otherwise, the expressions "about", "approximately", "substantially", and "in the order of" signify within 10%, preferably within 5%. Unless specified otherwise, the ordinal numeral adjectives, such as "first", "second", etc., are only used to distinguish elements from one another. In particular, these adjectives do not limit the described embodiments to a specific order of these elements.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements. Further, there is called "binary signal" a signal which alternates between a first constant state, for example a low state, noted "0", and a second constant state, for example a high state, noted "1". The high and low states of different binary signals of a same electronic circuit may be different. In practice, the binary signals may correspond to voltages or to currents that may not be perfectly constant in the high or low state.

Figure 1:
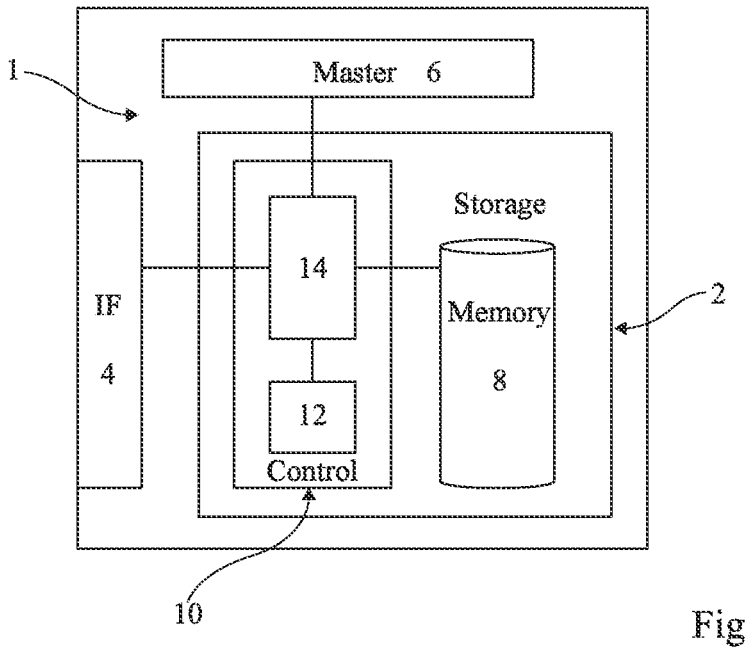
FIG. 1 partially and schematically illustrates an embodi-ment of an electronic system comprising a storage device.

FIG. 1 partially and schematically illustrates an embodiment of an electronic system 1, such as a system on chip, comprising at least one storage device 2, an interface (IF) for receiving control signals 4, and at least one master module 6.

According to an embodiment, master module 6 is a processor configured to execute program code.

Storage device 2 comprises a memory 8 and a controller 10 for controlling memory 8. Memory 8 is accessible in write mode and/or in read mode by master module 6 via controller 10. According to an embodiment, memory 8 is a volatile memory, that is, a memory for which any data element is lost at a powering off of memory 8. Memory 8 is, for example, a random access memory (RAM), in particular a static random access memory (SRAM). Controller 10 is, for example, a circuit, programmable (FPGA) or not (ASIC).

Figure 2:
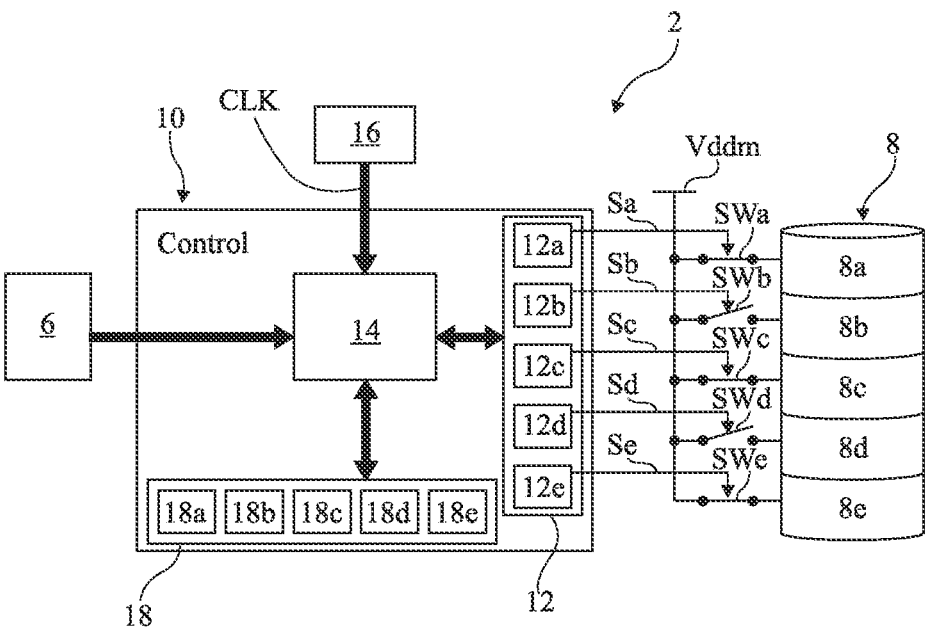
FIG. 2 illustrates a more detailed embodiment of the storage device of FIG. 1.

FIG. 2 partially and schematically shows a more detailed embodiment of elements of the system 1 of FIG. 1, particularly of storage device 2.

According to an embodiment, memory 8 comprises a plurality of memory units 8a, 8b, 8c, 8d, 8e (memory cuts) and of controller 10, five memory units 8a, 8b, 8c, 8d, 8e being shown as an example in FIG. 2. According to an embodiment, each memory unit 8a-8e has a size in the range from 1 kilobyte to 128 kilobytes, for example equal to 64 kilobytes. The number of memory units 8a-8e of memory 8 is, for example, in the range from 1 to 40 (this number being five in the example of embodiment illustrated in FIG. 2). Memory 8 has a general size equal to the sum of the respective sizes of its memory units 8a-8e. For example, this general size is of 600 kilobytes.

Figure 3:
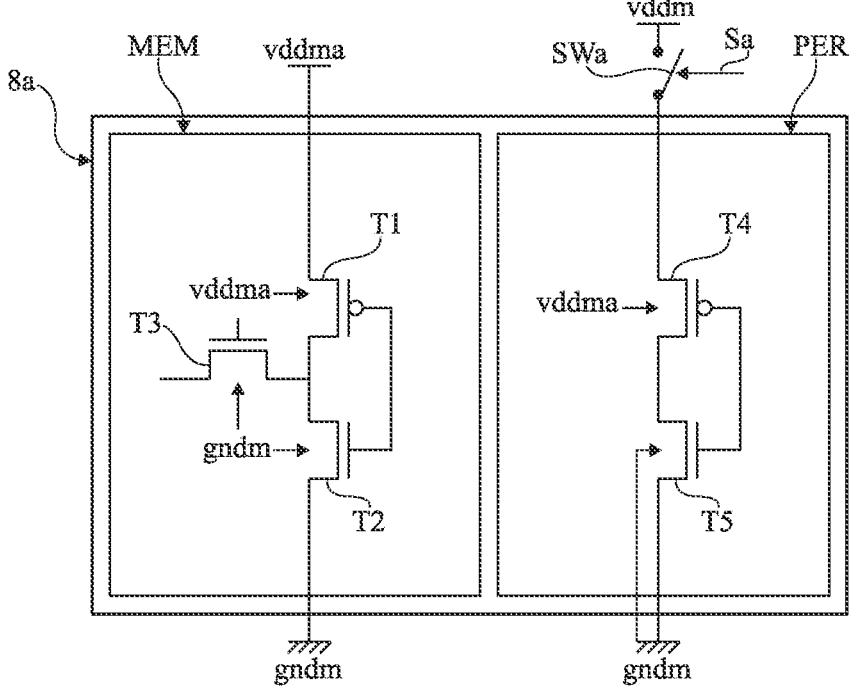
FIG. 3 illustrates an embodiment of a memory unit of the storage device of FIG. 2.

FIG. 3 partially and schematically shows an embodiment of memory unit 8a, knowing that each memory unit 8a-8e of memory 8 may have the structure shown in FIG. 3. Memory unit 8a comprises an array MEM of memory cells for the storage of data and peripheral circuits PER, particularly for the access to memory cells of the array MEM of memory cells, the transmission of data to be stored into the memory cells of array MEM, or the transmission of data read from the memory cells of array MEM. According to an embodiment, the array MEM of memory cells and peripheral circuits PER comprise electronic components, for example field-effect transistors, in particular insulated gate field-effect transistors (MOSFET, Metal Oxide Semiconductor Field Effect Transistor), called MOS transistors hereafter.

According to an embodiment, for each memory unit 8a-8e of memory 8, the electronic components of the array MEM of memory cells and of peripheral circuit PER are coupled to a source gndm of a low reference potential, for example the ground. The power supply of the electronic components of the array MEM of memory cells is performed by a first source vddma of a high reference potential. The power supply of the electronic components of peripheral circuit PER is performed by a second source vddm of a high reference potential via a controllable switch SWa. The high reference potential of first source vddma may be identical to or different from the high reference potential of second source vddm. Controllable switch SWa is controllable by a control signal Sa, for example a binary signal. As an example, controllable switch SWa is turned on when control signal Sa is in a first state, for example state "1", and is turned off when control signal Sa is in a second state, for example state "0". According to an embodiment, controllable switch SWa may comprise a MOS transistor and control signal Sa may correspond to the gate voltage of the MOS transistor.

As an example, there has been shown a memory cell of array MEM in FIG. 3 comprising a first MOS transistor T1, for example with a P channel, a second MOS transistor T2, for example with an N channel, and a third MOS transistor T3, for example with an N channel. The source of MOS transistor T1 is coupled, preferably connected, to the first source vddma of the high reference potential. The source of MOS transistor T2 is coupled, preferably connected, to the source gndm of the low reference potential. The drain of transistor T1 is coupled, preferably connected, to the drain of transistor T2. The gate of transistor T1 is coupled, preferably connected, to the gate of transistor T2. The source or the drain of transistor T3 is coupled, preferably connected, to the drain of transistor T1. According to an embodiment, transistors T1, T2, and T3 are formed in integrated fashion. The N-type well of transistor T1 is coupled, preferably connected, to the first source vddma of the high reference potential. The P-type well of transistor T2 is coupled, preferably connected, to the source gndm of the low reference potential. The P-type well of transistor T3 is coupled, preferably connected, to the source gndm of the low reference potential.

As an example, there has been shown peripheral circuit PER in FIG. 3 comprising a fourth MOS transistor T4, for example with a P channel, and a fifth MOS transistor T5, for example with an N channel. The source of MOS transistor T4 is coupled to the second source vddm of the high reference potential. The source of MOS transistor T5 is coupled, preferably connected, to the source gndm of the low reference potential. The drain of transistor T4 is coupled, preferably connected, to the drain of transistor T5. The gate of transistor T4 is coupled, preferably connected, to the gate of transistor T5. According to an embodiment, transistors T4 and T5 are formed in integrated fashion. The N-type well of transistor T4 is coupled, preferably connected, to the first source vddma of the high reference potential. The P-type well of transistor T5 is coupled, preferably connected, to the source gndm of the low reference potential.

Each memory unit 8a-8e of memory 8 is configurable in two operating modes: a first mode called RUN mode, and a second mode called SLEEP mode. In the RUN mode and in the SLEEP mode, the array MEM of memory cells of each memory unit 8a-8e is powered by the first source vddma of the high reference potential. Memory unit 8*a*-8*e* is then capable of retaining data until a subsequent powering off of the memory unit. This means that data may be stored in the memory unit.

In the RUN mode, the peripheral circuit PER of memory unit 8*a*-8*e* is powered by the second source vddm of the high reference potential. Operations of data writing into the array MEM of memory cells of memory unit 8*a*-8*e* and operations of reading of the data stored in the array MEM of memory cells of memory unit 8*a*-8*e* may be carried out. The RUN mode is typically used during the execution of a program by master module 6, where master module 6 is led to writing/reading data into/from the memory unit. In the SLEEP mode, the peripheral circuit PER of memory unit 8*a*-8*e* is not powered by the second source vddm of the high reference potential. Operations of data writing into the array MEM of memory cells of memory unit 8*a*-8*e* and operations of reading of data stored in the array MEM of memory cells of memory unit 8*a*-8*e* cannot be carried out. The SLEEP mode is a low-power mode, as compared with mode RUN. In the SLEEP mode, the data stored in memory unit 8*a*-8*e* are kept but operations of reading from/writing into the memory unit cannot be carried out. The different memory units 8*a*-8*e* are configurable in one or the other of these operating modes independently from one another. In other words, memory units different from memory 8 may be configured in different operating modes.

Controller 10 has the function of configuring each memory unit 8*a*-8*e* of memory 8 in one or the other of the RUN or SLEEP operating modes.

Considering FIG. 2 again, there has been shown for each memory unit 8*a*-8*b* the associated controllable switch SWa-SWb controlled by the corresponding control signal Sa-Se. Controller 10 comprises a plurality of registers 12, including, as illustrated in FIG. 2, a mode register 12*a*, 12*b*, 12*c*, 12*d*, 12*e* for each memory unit 8*a*-8*e*, five mode registers being shown as an example in FIG. 2. Each mode register 12*a*-12*e* is intended to store the current operating mode of the associated memory unit 8*a*-8*e*. In other words, each memory unit 8*a*-8*e* is associated with a mode register 12*a*-12*e* which is specific thereto.

For example, a mode register 12*a*-12*e* may store: —a first value, such as logic state "0", to indicate the SLEEP mode; or a second value, such as logic state "1", to indicate the RUN mode.

A mode register 12*a*-12*e* may thus be coded on a single bit. According to an embodiment, control signal Sa-Se is obtained from the value stored in mode register 12*a*-12*e*. According to an embodiment, a value "1" stored in mode register 12*a*-12*e* corresponds to a control signal Sa-Se corresponding to state "1" and a value "0" stored in mode register 12*a*-12*e* corresponds to a control signal Sa-Se corresponding to state "0".

Controller 10 further comprises a processing unit 14, configured to process requests of access to memory 8 originating from master module 6. Processing unit 14 is capable of relaying to memory units 8*a*-8*e* the access requests transmitted by the master module 6 of system 1. Processing unit 14 is further configured to modify the operating mode of each memory unit 8*a*-8*e* and is adapted to modifying the value stored in each mode register 12*a*-12*e*.

Processing unit 14 may comprise an automaton with a finite number of states (finite-state automaton or finite state machine (FSM)) receiving the access requests transmitted by the master module 6 of system 1. Processing unit 14 further receives a clock signal CLK supplied by a clock signal source 16. Controller 10 further comprises counters 18. According to an embodiment, processing unit 14 comprises one counter 18*a*, 18*b*, 18*c*, 18*d*, 18*e* for each memory unit 8*a*-8*e*, five mode counters being shown as an example in FIG. 2. Each counter 18*a*-18*e* is incremented at each pulse of clock signal CLK.

Figure 4:
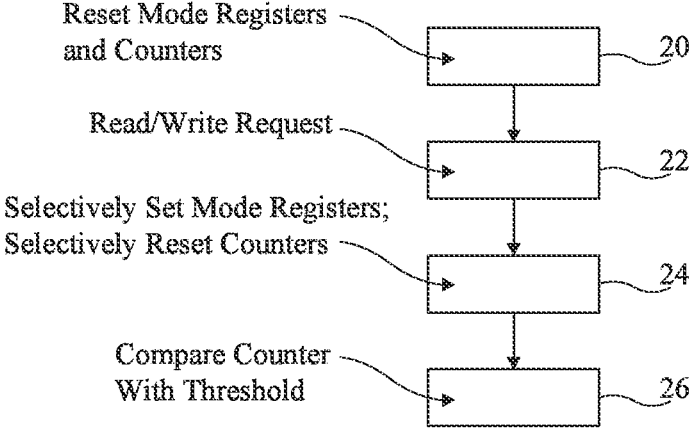
FIG. 4 is a block diagram illustrating an embodiment of an operating method of the storage device of FIG. 2.

FIG. 4 is a block diagram of an embodiment of an operating method of storage device 2.

At step 20, when system 1 is powered on, the mode registers 12*a*-12*e* of controller 10 are all set to value "1" and counters 18*a*-18*e* are all reset to zero. Each memory unit 8*a*-8*e* then is in the RUN mode.

At step 22, processing unit 14 receives requests from master module 6, for example a request for writing data into memory 8 or a request for reading data stored in memory 8. A write request typically comprises an address for the writing into memory 8 and the data to be written into memory 8, these data occupying a size indicated in the write request or that can be deduced therefrom. Processing unit 14 determines, based on the write request, the memory unit(s) 8*a*-8*b* of the memory 8 targeted by the request, that is, those having their content updated by the writing. This determination may be implemented before, during, or after the writing into memory 8. Similarly, a read request typically comprises an address for the reading from memory 8. Processing unit 14 determines, based on the read request, the memory unit(s) 8*a*-8*b* of the memory 8 targeted by the request, that is, those having a content to be read. This determination may be implemented before, during, or after the reading from memory 8.

At step 24, the mode register 12*a*-12*e* associated with each memory unit 8*a*-8*e* targeted by the write/read request is set to value "1" by processing unit 14. As an example, this positioning at value "1" is implemented once the writing or the reading has been performed. However, the mode registers 12*a*-12*e* of the memory units 8*a*-8*e* of memory 8 which are not concerned by the write/read request are not modified at step 24. Further, at step 24, the counter 18*a*-18*e* associated with each memory unit 8*a*-8*e* targeted by the write/read request is reset to zero. As an example, this resetting to zero is performed once the writing or the reading has been performed. However, the counters 18*a*-18*e* associated with the memory units 8*a*-8*e* of memory 8 which are not concerned by the write/read request are not reset to zero at step 24.

At step 26, processing unit 14 compares the content of each counter 18*a*-18*e* with a threshold. For each memory unit 8*a*-8*e*, if the content of counter 18*a*-18*e* associated with memory unit 8*a*-8*e* is greater than or equal to the threshold, the mode register 12*a*-12*e* associated with memory unit 8*a*-8*e* is set to value "0" by processing unit 14. This causes the turning off of the switch SWa-SWe associated with memory unit 8*a*-8*e*. Memory unit 8*a*-8*e* is then set to the SLEEP mode.

If the content of counter 18*a*-18*e* associated with memory unit 8*a*-8*e* is lower than the threshold, the mode register 12*a*-12*e* associated with the memory unit is not modified by processing unit 14 at step 26, and memory unit 8*a*-8*e* remains in the RUN mode. According to an embodiment, step 26 is only implemented for the memory unit 8*a*-8*e* having its associated mode register 12*a*-12*e* at value "1". According to an embodiment, the threshold corresponds to the elapsing of a time period longer than 1 ms, preferably in the range from 1 ms to 10 ms.

The operating mode of controller 10 enables to optimally decrease the power consumption of memory 8 when the latter is in the SLEEP operating mode, and this, with no loss of stored data.

System 1 may comprise a plurality of storage devices 2 according to the foregoing disclosure. Each of these devices 2 comprises a memory 8 and a controller 10 to specifically control this memory 8. In other words, there are as many controllers 10 as memories 8 in system 1. When system 1 comprises a plurality of memories, these memories may be of variables sizes and/or be used for different purposes. For example, system 1 may comprise: a first memory dedicated to the storage of execution data, particularly an execution stack, a second memory dedicated to the storage of security data, such as error correction codes, and a third memory forming an extension of the first memory.

Various embodiments and variants have been described. Those skilled in the art will understand that certain features of these various embodiments and variants may be combined, and other variants will occur to those skilled in the art. In particular, in the previously-described embodiments, for each memory unit 8a-8e of memory 8, the array MEM of memory cells of the memory unit is powered by a first source vddma of a high reference potential and the peripheral circuit PER of the memory unit is powered by a second source vddma of a high reference potential. As a variant, second source vddm may be one with first source vddma, the peripheral circuit PER of the memory unit being coupled to first source vddma by programmable switch SWa.

Finally, the practical implementation of the described embodiments and variants is within the abilities of those skilled in the art based on the functional indications given hereabove.

The invention claimed is:

1. A system, comprising:

a memory that includes a plurality of memory units accessible in write mode and in read mode;

wherein each memory unit comprises an array of memory cells and a peripheral circuit of access to said array of memory cells;

wherein each memory unit is configurable for operation in a first operating mode and a second operating mode;

wherein, in the first operating mode and the second operating mode, the array of memory cells are configured to retain data until a subsequent powering off of the memory unit;

wherein in the first operating mode the peripheral circuit is powered and wherein in the second operating mode the peripheral circuit is not powered; and a controller comprising a processing unit configured to separately control any memory unit of the plurality of memory units of the memory which has undergone no write or read access for a determined time period to be in the second operating mode;

wherein the controller further comprises a counter for each memory unit, each counter being incremented in response to each pulse of a clock signal, and wherein the processing unit is configured to reset the counter when a write or read access to the corresponding memory unit is performed.

2. The system according to claim 1, wherein the controller is configured to control any memory unit of the memory for which a write or read access is performed to be in the first operating mode.

3. The system according to claim 1, wherein, for each memory unit, the peripheral circuit of the memory unit is powered by a source of a high reference potential via a controllable switch, and wherein the controller is configured to control the turning on of the controllable switch when the memory unit is in the first operating mode and to control the turning off of the controllable switch when the memory unit is in the second operating mode.

4. The system according to claim 1, wherein the controller comprises a register for each memory unit, and the processing unit is configured to store a first value in the register when the corresponding memory unit is in the first operating mode and store a second value in the register when the corresponding memory unit is in the second operating mode.

5. The system according to claim 1, wherein, for each memory unit, the processing unit is configured to store the second value in the corresponding register when the corresponding counter exceeds a threshold.

6. The system according to claim 1, wherein the memory is a volatile memory.

7. The system according to claim 1, of system-on-chip type.

8. A system, comprising:

a memory including a plurality of memory units accessible in write mode and in read mode;

wherein each memory unit comprises an array of memory cells and a peripheral circuit of access to said array of memory cells;

a controller including a timer for each memory unit and a control register for each memory unit;

wherein the peripheral circuit is powered when the corresponding control register stores a first control value associated with a first operating mode and is not powered when the corresponding control register stores a second control value associated with a second operating mode;

wherein the array of memory cells is powered in both the first operating mode and the second operating mode; and wherein the controller is configured to use the timer associated with each memory unit to determine whether a time period in excess of a threshold has elapsed since a last write or read access to the array of memory cells within the corresponding memory unit has occurred, and in response thereto to switch the control register for that corresponding memory unit from the first control value to the second control value to change operation of that corresponding memory unit from the first operating mode to the second operating mode;

wherein the timer comprises a counter that is incremented in response to each pulse of a clock signal.

9. The system according to claim 8, wherein, controller switches the control register from the first control value to the second control value when a count value in the counter exceeds the threshold.

10. The system according to claim 8, wherein the memory is a volatile memory.

11. The system according to claim 8, of system-on-chip type.

* * * * *